US010684358B2

(12) United States Patent
Uyeno et al.

(10) Patent No.: US 10,684,358 B2
(45) Date of Patent: Jun. 16, 2020

(54) SITUATIONAL AWARENESS SENSOR USING A FIXED CONFIGURATION OF OPTICAL PHASED ARRAYS (OPAS)

(71) Applicant: Raytheon Company, Waltham, MA (US)

(72) Inventors: Gerald P. Uyeno, Tucson, AZ (US); Sean D. Keller, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 480 days.

(21) Appl. No.: 15/349,499

(22) Filed: Nov. 11, 2016

(65) Prior Publication Data

US 2018/0136318 A1    May 17, 2018

(51) Int. Cl.
| | | |
|---|---|---|
| *G01C 3/08* | (2006.01) | |
| *G01S 7/481* | (2006.01) | |
| *G01S 17/42* | (2006.01) | |
| *G02F 1/29* | (2006.01) | |
| *G01S 7/497* | (2006.01) | |
| *G01S 7/48* | (2006.01) | |
| *G01S 17/88* | (2006.01) | |

(52) U.S. Cl.
CPC .......... *G01S 7/4815* (2013.01); *G01S 7/4808* (2013.01); *G01S 7/4972* (2013.01); *G01S 17/42* (2013.01); *G01S 17/88* (2013.01); *G02F 1/292* (2013.01)

(58) Field of Classification Search
CPC ...... G01S 7/484; G01S 7/4814; G01S 7/4815; G01S 7/4817; G01S 7/4911
USPC ............................... 356/3.01–5.15
See application file for complete search history.

(56) References Cited

U.S. PATENT DOCUMENTS

| | | | | |
|---|---|---|---|---|
| 7,020,325 | B2* | 3/2006 | Park | A61C 13/0004 382/154 |
| 7,969,558 | B2* | 6/2011 | Hall | G01S 7/4813 356/5.01 |
| 8,767,190 | B2 | 7/2014 | Hall | |
| 9,679,215 | B2* | 6/2017 | Holz | G06K 9/00201 |
| 9,869,753 | B2* | 1/2018 | Eldada | G01S 17/89 |
| 10,067,230 | B2* | 9/2018 | Smits | G01S 17/023 |
| 2005/0190373 | A1* | 9/2005 | Pepper | G01P 5/26 356/484 |
| 2006/0114467 | A1* | 6/2006 | Nicoli | G01N 21/51 356/450 |
| 2009/0289187 | A1* | 11/2009 | Mian | G01S 17/89 250/330 |

(Continued)

OTHER PUBLICATIONS

MIT,"DARPA Demonstrates the Most Complex 2DOptical Phased Array Ever," SciTechDaily, Jan. 16, 2013, http://scitechdaily.com/darpa-demonstrates-the-most-complex-2d-optical-phased-array-ever/.

(Continued)

*Primary Examiner* — Samantha K Abraham
(74) *Attorney, Agent, or Firm* — Eric A. Gifford (57) ABSTRACT

A situation awareness sensor includes a plurality of N sensor channels, each channel including an optical phased array (OPA) having a plurality of solid-state laser emitters, a command circuit and a detector. The command circuit controls the relative phase between the laser emitters to command a divergence, shape and exit angle of a spot-beam to scan a channel field-of-view (FOV). The OPAs may be controlled individually or in combination to command one or more spot-beams to scan an aggregate sensor FOV and to track one or more objects.

24 Claims, 11 Drawing Sheets

(56) References Cited

U.S. PATENT DOCUMENTS

| | | | |
|---|---|---|---|
| 2016/0041266 A1* | 2/2016 | Smits | G01S 17/66 |
| | | | 356/5.01 |
| 2016/0245903 A1* | 8/2016 | Kalscheur | G01S 7/4817 |
| 2017/0307759 A1* | 10/2017 | Pei | G01S 17/10 |
| 2018/0120422 A1* | 5/2018 | Fujita | G01S 7/4817 |
| 2019/0025409 A1* | 1/2019 | Kawazoe | G01S 17/89 |

OTHER PUBLICATIONS

Calum Williams, "DARPA laser scanning: Bending light with a microchip," ExtremeTech, http://www.extremetech.com/extreme/206432-darpa-laser-scanning-bending-light-with-a-microchip, accessed May 3, 2016.

Sun et al., "Large-scale nanophotonic phased array," Jan. 10, 2013, vol. 493, Nature, pp. 195-199.

DARPA, "SWEEPER Demonstrates Wide-Angle Optical Phased ArrayTechnology," http://www.darpa.mil/news-events/2015-05-21, accessed Apr. 8, 2016.

\* cited by examiner

SITUATIONAL AWARENESS SENSOR USING A FIXED CONFIGURATION OF OPTICAL PHASED ARRAYS (OPAS)

BACKGROUND OF THE INVENTION

Field of the Invention

This invention relates to situational awareness sensors, and more particularly to a configuration of optical phased arrays (OPAs) to steer a laser spot-beam or beams over a sensor field-of-view (FOV).

Description of the Related Art

Situational awareness is the perception of environmental elements with respect to time or space, the comprehension of their meaning, and the projection of their status after some variable has changed, such as time, or some other variable, such as a predetermined event. Situational awareness is critical in complex, dynamic systems such as aviation, air traffic control, ship navigation, collision avoidance, object targeting etc.

Situational awareness sensors may be passive or active. Passive sensors use a detector and ambient energy to detect and track objects in the sensor's FOV. Active sensors use a laser to illuminate objects in the FOV and a detector to detect reflected energy. The active sensor may be configured to produce an intensity image or a range map of the illuminated object. Active sensors have the advantages of illuminating a target with a laser and being able to provide range information. However, lasers can be large and expensive and raise the overall "SWaP-C" (size, weight, power and cost) of the sensor.

One type of active sensor uses flash illumination to simultaneously illuminate the entire FOV and a pixelated detector to detect reflected energy. This approach requires a laser with a lot of power, hence size, weight and cost, to provide the requisite energy density over the FOV to detect objects at typical distances. Flash illumination also produces atmospheric backscatter that reduces the signal-to-noise ratio (SNR) of the detected objects. Flash illumination does have the benefit of no moving parts.

Another type of active sensor uses a single laser to generate a collimated spot-beam. A mirror is physically rotated to scan the collimated spot-beam over a 360 degree horizontal FOV. The entire sensor may be actuated up and down to scan a desired vertical FOV. A single detector senses a reflected component of the spot-beam. This approach can use a less powerful laser and avoids atmospheric backscattering but is mechanically scanned.

Velodyne Lidar offers a suite of LIDAR sensors that provide a 360 degree horizontal FOV and a 30-40 degree vertical FOV for real-time autonomous navigation, 3D mobile mapping and other LIDAR applications (U.S. Pat. Nos. 7,969,558 and 8,767,190). The LIDAR sensor includes a base, a housing, a plurality of photon transmitters and photon detectors contained within the housing, a rotary motor that rotates the housing about the base, and a communication component that allows transmission of signals generated by the photon detectors to external components. The photon transmitters and detectors of each pair are held in a fixed relationship with each other. The rotary component includes a rotary power coupling configured to provide power from an external source to the rotary motor, the photon transmitters, and the photon detectors. This approach uses small emitter/detector pairs but requires mechanical rotation to scan the horizontal FOV.

As reported by Jie Sun et al. "Large-scale nanophotonic phased array" Jan. 10, 2013, Vol 493 Nature pp. 195-199, researchers funded from DARPA's Short-Range, Wide Field-of-View Extremely agile, Electronically Steered Photonic Emitter (SWEEPER) program demonstrated a 2-D optical phased array (OPA) composed of 64×64 nanoantennas integrated onto a silicon chip roughly the size of the head of a pin. By controlling the phase relationships of the nanoantennas, the OPA can form and sweep a laser beam back and forth more than 100,000 times per second across a 51° arc, more than 10,000 times faster than the state-of-the-art mechanical system.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a situational awareness sensor in which a plurality of optical phased arrays (OPAs) is configured to scan a spot-beam or beams to address a sensor FOV. An exemplary embodiment of an OPA being the DARPA-funded nanophotonic phased array.

In an embodiment, a situational awareness sensor comprises a structure having a plurality of N optical apertures. N sensor channels are positioned in the structure in alignment with the N apertures, respectively. Each sensor channel includes an optical phased array (OPA) having a plurality of solid-state laser emitters each configured to emit laser energy, a command circuit responsive to command signals to apply activation signals to the plurality of solid-state laser emitters to control the phase between the laser energies emitted from adjacent laser emitters to generate and control a divergence, shape and exit angle of a spot-beam (pulsed or continuous wave) through its aperture to scan the spot-beam across a channel field-of-view (FOV) and a detector configured to sense a reflected component of the spot-beam from an object to provide angle and range measurements to the object. The channel FOVs cover in the aggregate a sensor FOV. A controller is configured to issue said command signals to each of the N sensor channel command circuits to command one or more of spot-beams to address the sensor FOV.

In an embodiment, the N optical apertures are spaced around the structure's circumference and the N sensor channels are spaced around and extend radially from a center of the structure in alignment with the apertures. The channel FOVs cover in the aggregate a 360° (horizontal) sensor FOV.

In different embodiments, the controller is configured to vary the shape of the spot-beam based on an estimated surface of the object to maximize the reflected component of the spot beam, to adjust the divergence of the spot-beam to place the spot-beam on the object such that the reflected component varies as approximately 1/range$^2$ and to adjust the divergence of the spot-beam to maintain an approximately constant spot size on the objet.

In an embodiment, in a scan mode the controller issues command signals to each of the N sensor channels to sequentially generate and steer respective spot-beams to produce a single contiguous spot-beam that scans the sensor FOV. For example, for a 360° (horizontal) sensor FOV the single contiguous spot-beam may go round and round. In another embodiment, the controller issues command signals to time multiplex a track mode with the scan mode. In the track mode, channels in which an object is detected, generate and steer a spot-beam to track that object when not engaged to support scan mode. Scan mode may engage one or more of the channels in a given time slot to increase the scan mode duty cycle.

In an embodiment, in a scan mode the controller issues command signals to each of said N sensor channels to generate respective plane waves that cover each channel FOV in all channels simultaneously to cover (flood) the sensor FOV. In a track mode the controller issues command signals to each of said N sensor channels in which an object is detected to generate and steer respective spot-beams that each cover less than 5% of the channel FOV to track each said object.

In an embodiment, the N sensor channels are configured so that adjacent channel FOVs overlap in an overlapped FOV. The sensor may include a mechanism configured to rotate the structure to point the overlapped FOV at the object. The sensor requires no other parts other than possibly this mechanism which only adds additional capability to the primary embodiment. In a track mode, the controller is configured to predict movement of the object from the current channel FOV to an adjacent channel FOV. In a track mode, to hand-off an object from one channel to the next, the controller is configured to generate only one spot-beam to track the object in the overlapped FOV it the spot-beams are incoherent and to fade/ramp the spot-beams if the beams are coherent. In a track mode, the controller is configured to issue command signals to at least three adjacent sensor channels that overlap in the overlapped FOV to steer and time multiplex their respective spot-beams at the object in the overlapped FOV to make measurements of the object from three different angles. This approach provides advantages of providing triangulation and computing a bi-directional reflectance distribution function (BRDF). In a track mode, the controller is configured to measure phase differences between adjacent sensor channels and adjust the relative phase so that the spot-beams add coherently at the object in the overlapped FOV.

In an embodiment, multiple situational awareness sensors are stacked to extend and overlap a vertical FOV. In one configuration, the sensors are stacked one on top of the next in parallel planes. In another configuration, the sensors are stacked in tilted planes that share a common vertex to increase the overlap in the vertical FOV.

In an embodiment, the sensor is mounted on a vehicle and configured to maintain centering of the vehicle relative to objects on opposing sides of the vehicle.

In an embodiment, the sensor is mounted on a platform and configured to determine a rotation of the platform based on the change in angle of known objects across multiple channels.

In an embodiment, at least two and possibly all sensor channels are configured to detect objects at different ranges to the object.

In an embodiment, at least two and possibly all sensor channels are configured to detect objects at different wavelengths.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a situational awareness sensor that includes a plurality of N sensor channels, each channel including an optical phased array (OPA) having a plurality of solid-state laser emitters, a command circuit and a detector. A controller issues commands to the N channels. The command circuit controls the relative phase between the laser emitters to command a divergence, shape and exit angle of a spot-beam to scan a channel FOV. The OPAs may be controlled individually or in combination to command one or more spot-beams to scan an aggregate sensor FOV and to track one or more objects. The detector is configured to sense a reflected component of the spot-beam(s) from an object to provide angle and range measurements to the object. Either the detector or controller may be configured to process the reflected component to provide the angle and range.

Referring now to FIGS. 1a-1b, 2 and 3, an embodiment of a situational awareness sensor 10 includes a structure 12 having a plurality of N optical apertures 14. Structure 12 is suitably a solid body having an inner portion removed to define channels for installation and mounting of multiple sensor channels 20. Each sensor channel 20 is configured to command a spot-beam 24 to scan across a channel FOV 26. In the aggregate, the sensor channels 20 command one or more spot-beams 24 to address a sensor FOV 28 in a "scan mode" to detect one or more objects 29 or a "track mode" to track the one or more objects 29.

Figure 1A:
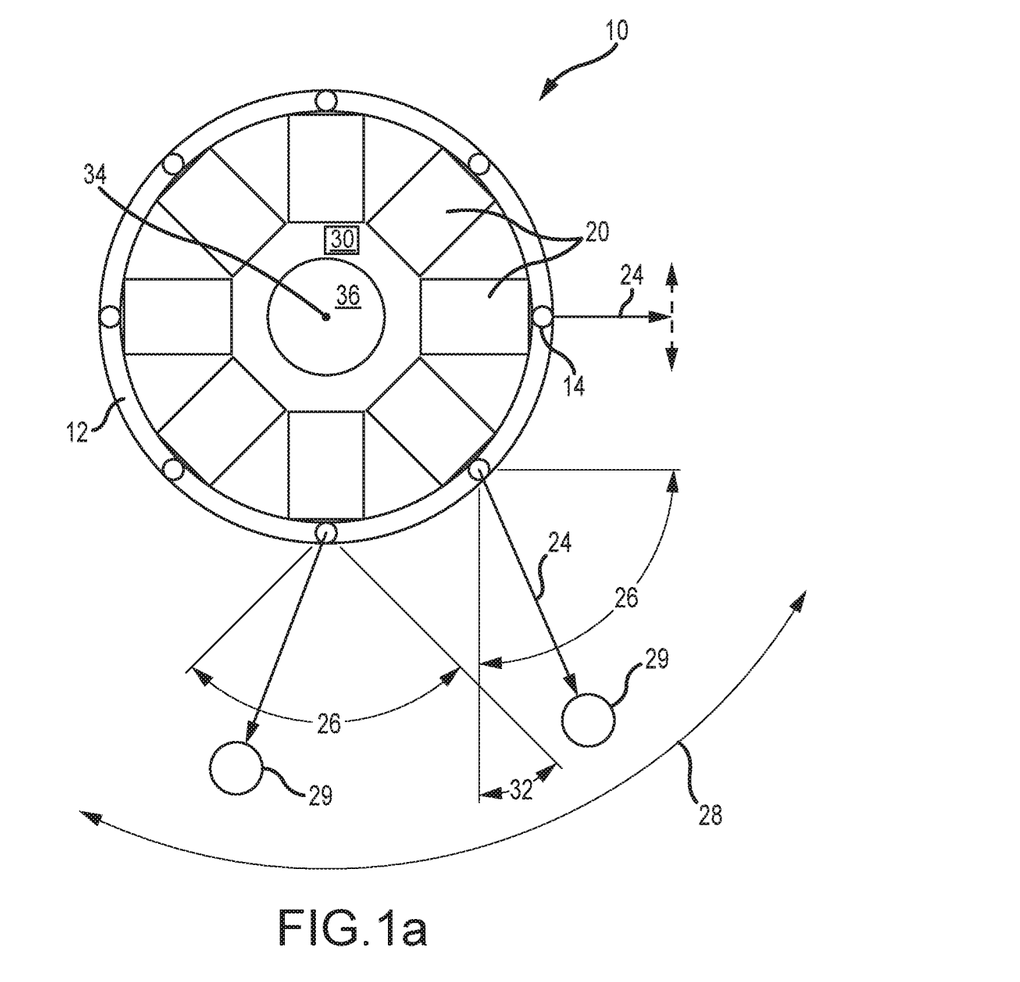
FIGS. 1a and 1b are a top and a side section view of an embodiment of a situational awareness sensor configured with Optical Phased Arrays (OPAs)
Figure 1B:
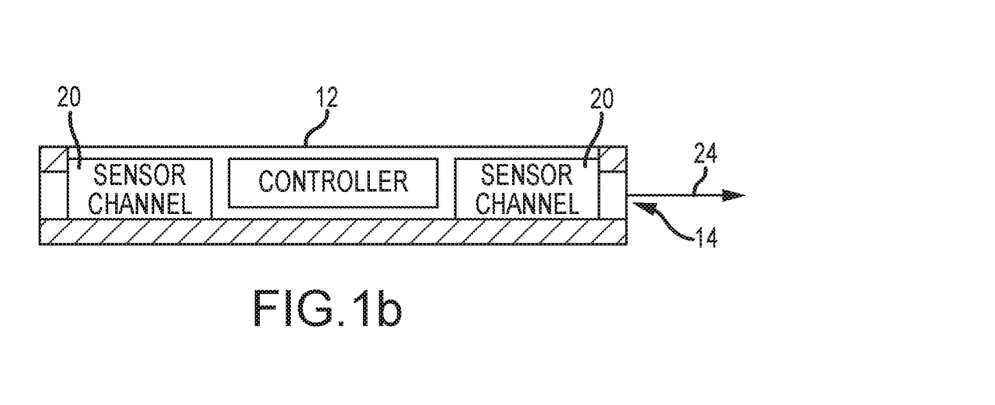

A controller 30 receives digital system commands from system processors to cue the sensor to execute search and/or track modes and possibly modify beam parameters such as direction, divergence, shape, power etc. and issues channel command signals to the one or more sensor channels 20 to specify an exit angle, divergence and shape of the one or more spot-beams 24 to execute the scan or track modes. The "direction" is the exit angle of the spot-beam measured as a +/− angle with reference to a channel axis. The "divergence"

of an optical beam is an angular measure of the increase in beam diameter with distance from the optical aperture. The divergence represents the deviation from a perfectly collimated beam. The "shape" is the spatial shape of the beam wavefront e.g., spherical, planar, oblong etc. Controller 30 suitably comprises one or more digital processors configured to generate the channel command signals, which may be specified as a function of time or, more typically, as time-stamped commands. These digital commands may be communicated in a digital protocol such as RS-232, 422, TTL, I2C, SPI or other like protocols. Controller 30 may also be configured to receive digital data from each sensor channel as to channel operation and any data (raw or processed) on detected or tracked objects.

In an embodiment, the channel FOVs 26 of adjacent sensor channels 20 overlap in an overlapped FOV 32. For example, channel FOVs 26 of 51° may overlap by 10°-15° on both sides. In certain configurations, the channel FOVs 26 of three adjacent sensor channels may overlap in the overlapped FOV 32 within the FOV 26 of the center channel. For example, the channel FOVs 26 of 51° each may overlap 10°-15° in the center channel. Overlapping may facilitate hand-off of the spot-beam from one channel to the next in scan mode, prediction and hand-off of the spot-beam from one channel to the next in track mode, coherent adding of multiple spot-beams to increase reflected power or providing angular diversity of the reflected component.

In an embodiment, the N optical apertures 14 are spaced around the structure's circumference and the N sensor channels 20 are spaced around and extend radially from a center 34 of the structure in alignment with the apertures. The channel FOVs 26 suitably covering in the aggregate a 360° (horizontal) sensor FOV 28. Each sensor has a vertical FOV that typically matches the beam divergence in the vertical direction.

The cross-section of structure 12 may be a continuous circle or an N-gon as determined by the application and number of apertures N. A through hole or recess 36 may be defined through the center of the body and adapted for mounting on a vertical mounting structure such as a post or a mast.

Figure 2:
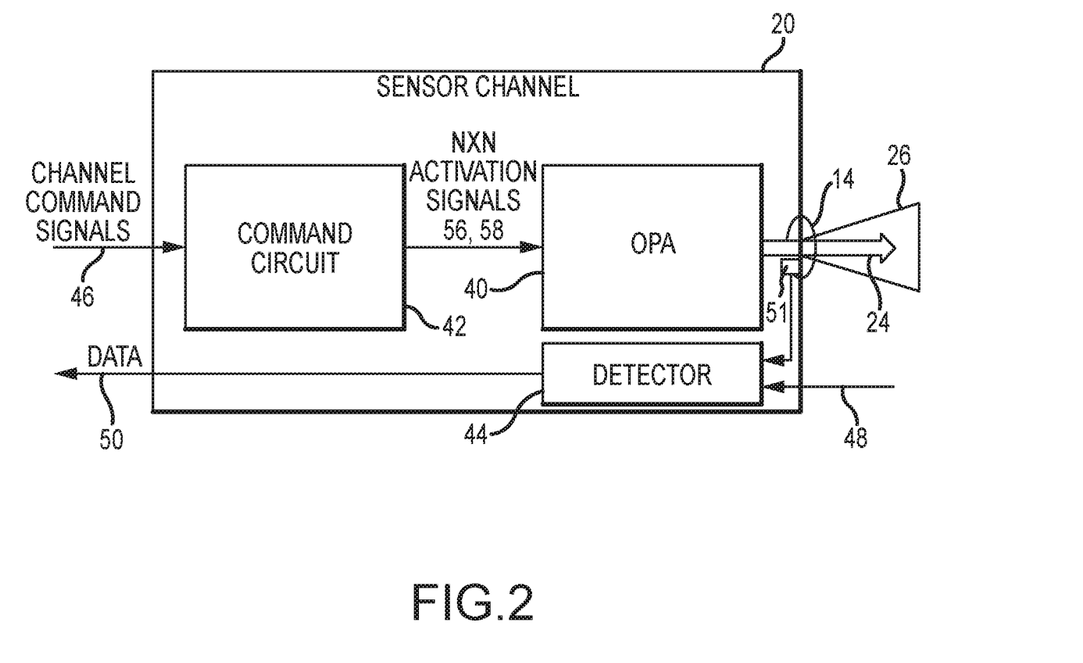
FIG. 2 is a block diagram of an embodiment of a channel of the situational awareness sensor.

In reference to FIG. 2, an embodiment of sensor channel 20 comprises an optical phased array (OPA) 40, a command circuit 42 and a detector 44. Sensor channel 20 receives as an input channel command signals 46 (digital signals) from the controller that specify an exit angle, divergence, shape and possibly power of the spot-beam for each active sensor channel. The command signals may be specified as a function of time or, more typically, as time-stamped commands. Sensor channel 20 generates as an output one or more optical spot-beams 24 at the specified exit angle, divergence, shape and power to scan a sensor FOV to detect objects or to track specific objects in the sensor FOV. Sensor channel 20 receives as an input a reflected component 48 of spot-beam 24 off of the object. Sensor channel 20 generates as an output data 50 associated with the reflected component 48. The data 50 may be raw data that is returned to the controller via digital or discrete lines to process and extract angle-to-object and range-to-object measurements or the data may be the processed by the detector 44 to extract the angle-to-object and range-to-object measurements. An optical "pick-off" 51 may be placed at aperture 14 to sample a small portion (e.g., <1%) of the transmitted optical spot-beam 24 for processing such as to measure the phase of the transmitted spot-beam.

Figure 3:
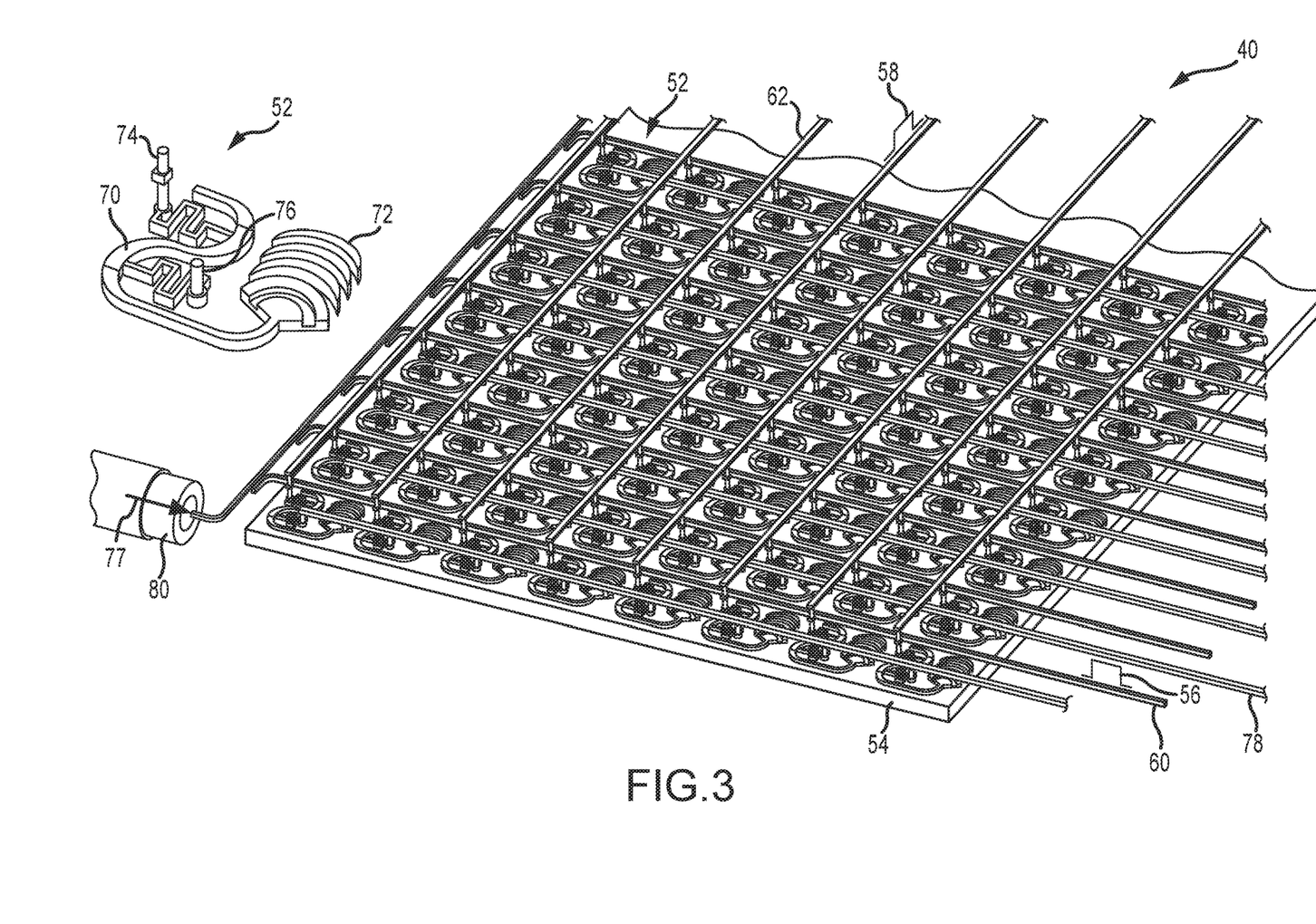
FIG. 3 is a diagram of an embodiment of an OPA.

In an exemplary embodiment, OPA 40 is an embodiment of the DARPA-funded nanophotonic phased array as shown in FIG. 3. The array as described in Jie Sun et al. "Large-scale nanophotonic phased array" Jan. 10, 2013, Vol 493 Nature pp. 195-199 is hereby incorporated by reference. The 2-D optical phased array (OPA) 40 includes M×M (e.g., 64×64) solid-state laser emitters 52 (also referred to as "nanoantennas") integrated onto a silicon chip 54. A laser input 77 is coupled into the main silicon bus waveguide through an optical fibre 80, and then evanescently coupled into M row waveguides, which is similarly divided into M laser emitters so that all M×M laser emitters are uniformly excited. By controlling the phase relationships of the laser emitters 52 (more particularly the phase relationships of the laser energies emitted by the laser emitters 52), the OPA can form and sweep a laser spot beam (pulsed or CW) back and forth more than 100,000 times per second across a 51° arc, more than 10,000 times faster than the state-of-the-art mechanical system. By sizing the laser emitters, the OPA may be configured to form a spot beam in any optical band including but not limited to visible, IR (SWIR, NIR, MWIR, LWIR) or UV. The phase relationships are controlled by analog activation signals 56 and 58 applied to row and column control wires 60 and 62, respectively. Activation signals 56 may be high voltage or high current waveforms designed to enable the flow of optical energy from the emitter. In an embodiment illustrated in FIG. 1 of the Nature paper, the OPA uses two segments of optical delay lines to achieve a desired phase delay. In an embodiment illustrated in FIG. 4 of the Nature paper, the optical phase of each pixel is continuously tuned by the thermo-optic effect through an integrated heater formed by doped silicon. Each "pixel" includes Si heater 70, a nanoantenna 72 and a pair of contacts 74 and 76 connected to the row and column control wires 60 and 62, respectively. The version of OPA shown in FIG. 1 of the Nature paper does not include the Si heater.

Enabling the flow of optical light from a single laser emitter (or "nanotantenna") generates a single spherical-like wavefront that propagates into space perpendicular to the array. The emitter array generates a waveform based on the phase difference between adjacent emitters (more specifically the laser emissions between adjacent emitters). The properties of the waveform are determined by the phase difference and include: divergence, intensity, shape (spatially) and angle.

The time each emitter is propagating optical light determines the temporal pulse width of the propagating wave. If all emitters are activated at one time to propagate light, the wavefront will be planar. A spherical diverging wavefront is created by emitting from the central portion of the array and then activating emitters radially outward. The divergence of the wavefront is determined by the time gradient of the activated emitters e.g., to have a slowly diverging wavefront, the time delay between radial emitters is smaller than for a quickly diverging wavefront.

The shape of the wavefront can be changed by having a non-linear change in phase difference between emitters. For example a wavefront similar to a hermite Gaussian mode will have two regions, where each region has a central emitter that the radial emitters referenced against. Intersections between the regions form a boundary where the spatial intensity is matched to form a coherent wavefront.

In reference to FIG. 2, command circuit 42 converts the digital channel command signals 46 that specify angle, divergence, shape and possibly power to the M×M row and column analog activation signals 56 and 58 that are applied to the OPA's row and column control wires to excite the laser emitters and set the phase relationships between adjacent laser emitters to produce a spot-beam with the specified angle, divergence, shape and power. Command circuit 42 suitably includes a communication transceiver to receive the command signals, a digital processor to convert the channel command signals to M×M digital commands, and an M×M array of digital-to-analog converters to convert the digital commands to the analog activation signals.

Detector 44 is configured to sense a reflected component 48 of the spot-beam 24 and generate data 50. Detector 44 may pass raw data or include a processor to process the data to output the angle and range measurements to the object. For a pulsed spot-beam, the range measurement is computed by knowing the transmit time and measuring the receive time. The "time of flight" gives the range. The angle measurement is computed by knowing the resulting exit angles commanded by the N×N activation signals 56, 58 or the location of the returned spot beam on the detector 44. For a CW spot beam, the range is computing using the phase measurement and the angle is computed in the same fashion as with the pulsed spot beam.

Detector 44 is suitably and M×N pixel array where M is the height in pixels for the vertical FOV and N is the width in pixels for the horizontal FOV. Because the OPA sweeps the spot-beam back-and-forth in 1D motion across the horizontal FOV the detector array could in theory have a single pixel height (M=1). However, due to the divergence of any real spot-beam the pixel array will typically have a plurality of pixels in the vertical direction, M>1. A typical detector may be at least 100×100 pixels. To detect a spot-beam at 1.064 nm, the detector is typically fabricated using a Silicon (Si) technology. To detect a spot-beam at 1.55 nm, the detector is typically fabricated using a Indium Gallium Arsenide (InGaAs) technology.

Figure 4A:
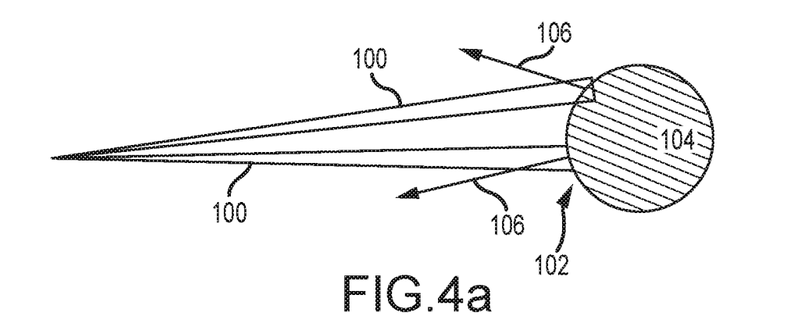
FIGS. 4a-4c are diagrams illustrating different techniques to control the laser-spot beam with the OPA.
Figure 4B:
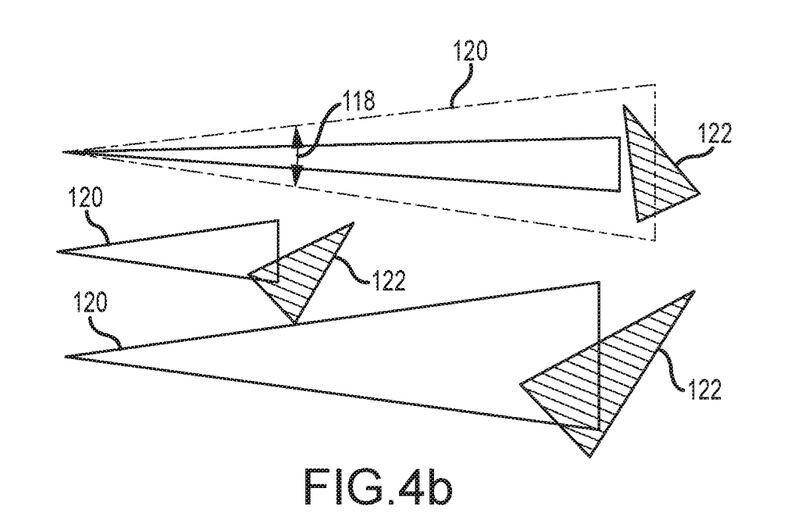
Figure 4C:
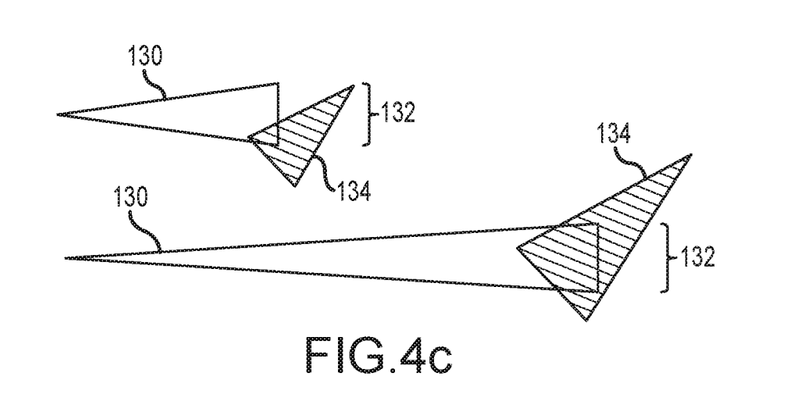

Referring now to FIGS. 4*a*-4*c*, in different embodiments, the controller is configured to vary the shape or divergence of the spot-beam to optimize the reflected component of the spot-beam.

As shown in FIG. 4*a*, the controller is configured to vary the spatial shape of the wavefront of a spot-beam 100 based on an estimated surface shape 102 of an object 104 to maximize a reflected component 106 of the spot beam. The radius of curvature of the transmitted spot-beam 100 is known (or measured via the "pick-off") and the radius of curvature of the reflected component 106 is calculated from the angle and range measurements. The radius of curvature of object 104 is calculated from the radii of the transmitted and reflected beams. Knowing the radius of curvature of the object, the controller can vary the shape of the wavefront of the transmitted spot-beam 100 to maximize the energy in the reflected component 106.

As shown in FIG. 4*b*, the controller is configured adjust a divergence 118 of a spot-beam 120 to place the entire spot-beam on an object 122 such that a reflected component varies as approximately 1/range$^2$ (all energy reflected by target). The size of spot-beam 120 must be smaller than the object at the object. This may be accomplished by focusing the spot-beam 120 on the object 122 or simply ensuring that the beam is smaller than the object. The controller measures the range-to-object and adjusts the divergence accordingly. Without such an adjustment, the reflected component for a far-field object would be 1/range$^4$ and some energy would not be reflected by the target.

As shown in FIG. 4*c*, the controller is configured to adjust the divergence of a spot-beam 130 to maintain an approximately constant spot size 132 on an object 134. One cannot assume the spot-beam is truly collimated and must adjust the divergence if the goal is to maintain a constant spot size on the object.

An advantage provided by the OPA-based situational awareness sensor is the flexibility to provide, adapt and combine, various different scan and track modes as required for a given application. The sensor may be configured to scan a single or multiple spot-beams back-and-forth across an aggregate sensor FOV or in circles around the aggregate sensor FOV or to flood the entire sensor FOV. The sensor may be configured to track one or more objects in the different channel FOV and to handoff that track as the object moves through the sensor FOV. The sensor may be configured to track the same object with multiple adjacent channels to either increase reflected power (coherent) or increase angle diversity (incoherent). The sensor may be configured to time multiplex the scan and track modes to more fully utilize the capabilities of the sensor. All of these functions may be accomplished without requiring any mechanical moving parts.

Figure 5A:
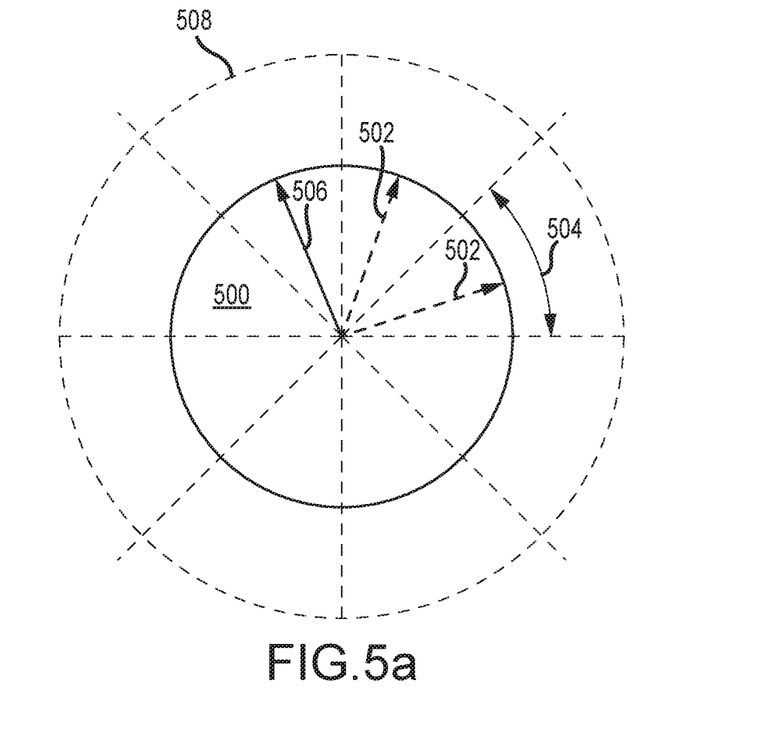
FIGS. 5a-5c are diagrams illustrating an embodiment for time multiplexing a scan mode and a track mode.
Figure 5B:
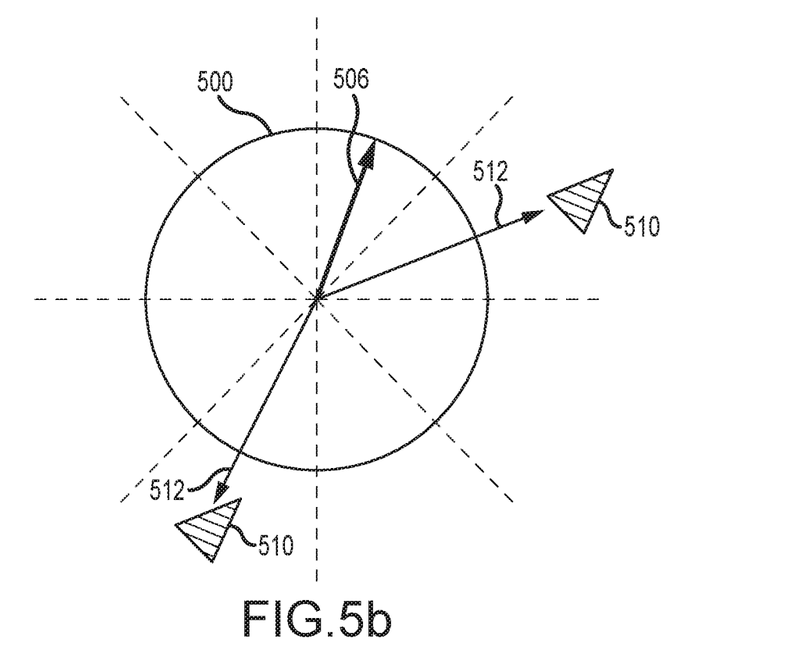
Figure 5C:
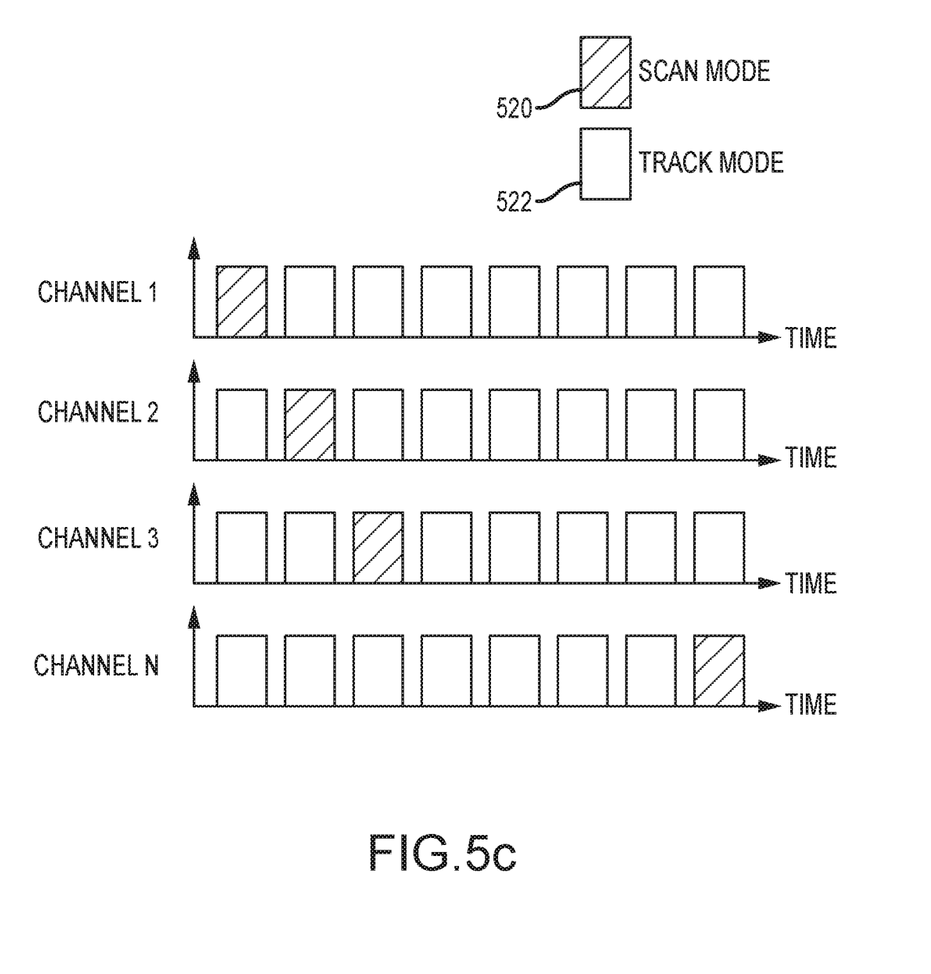

Referring now to FIGS. 5*a* through 5*c*, in an embodiment of a sensor 500, in a scan mode the controller issues channel command signals to each of the N sensor channels to sequentially generate and steer respective spot-beams 502 over their respective channel FOV 504 to produce a single contiguous spot-beam 506 that scans an aggregate sensor FOV 508. For example, for a 360° (horizontal) sensor FOV the single contiguous spot-beam 506 may go round and round. In another embodiment, the controller issues command signals to time multiplex a track mode with the scan mode. In the track mode, channels in which an object 510 is detected, generate and steer a spot-beam 512 to track that object when not engaged to support scan mode.

Scan mode may engage one or more of the channels in a given time slot to increase the scan mode duty cycle. For example, scan mode could produce a pair of spot-beams 180° out of phase (opposite sides of the sensor) to effectively double the scan coverage of the sensor FOV. For example as shown in FIG. 5*c*, given N=8 sensor channels, if there is a single contiguous spot-beam for scan mode, each channel is configured to track for ⅛ 520 of the scan period to implement scan mode and for ⅞ 522 of the scan period to implement track mode. If there is a pair of contiguous spot-beams for scan mode, each channel can be configured for ⅚ of the scan period to implement track mode and so forth. The sensor may be configured to adapt the relative duty cycle of scan and track modes based on either received commands or detected and tracked objects. For example, if no objects are being tracked, the sensor may allocate 100% of the duty cycle to scan mode. Once objects are detected, the sensor may balance the duty cycle between scan and track modes. If the number of objects increases, proximity of objects decreases or the threat level is raised, the sensor may allocate more duty cycle to track mode. If a particular object is of sufficient interest, the sensor may lock on to that object and suspend those channels tracking the object from participating in scan mode to avoid breaking track.

Figure 6A:
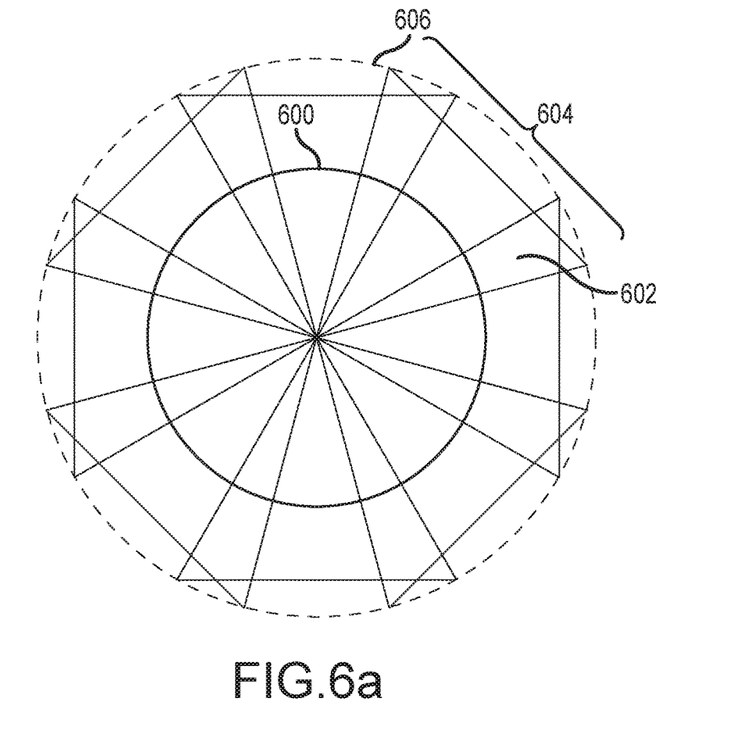
FIGS. 6a-6b are diagrams illustrating an embodiment for a time sequential scan mode and track mode.
Figure 6B:
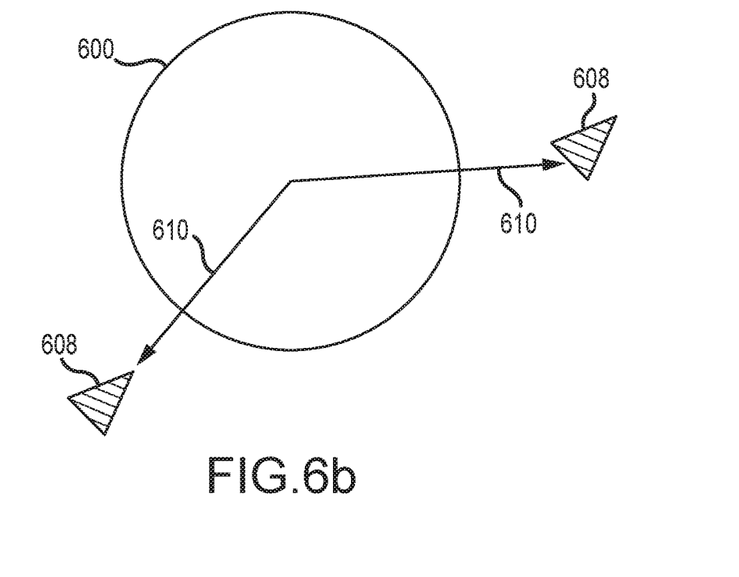

Referring now to FIGS. 6*a* and 6*b*, in an embodiment of a sensor 600, in a scan mode the controller issues command signals to each of said N sensor channels to generate respective plane wave spot-beams 602 that cover each channel FOV 604 in all channels simultaneously to cover (flood) a sensor FOV 606. In a track mode the controller issues command signals to each of said N sensor channels in which an object 608 is detected to generate and steer respective spot-beams 610 that each cover less than 5% of the channel FOV to track each object. The sensor may be configured to time multiplex the scan mode and the track mode.

In an embodiment, for either the circular or flood scan of the sensor FOV, once an object is detected, the controller can activate only the sensor channel in which the object is detected to retract that sensor channel's FOV for some period of time to improve the range and angle estimate, and then return to the scan mode.

In an embodiment, if there are multiple detections, the controller can be configured to prioritize objects to track based on, for example, proximity of the object, track of the object towards the sensor etc.

In an embodiment, the controller can be configured to determine if multiple object detections across multiple sensor channels is a single large object.

Figure 7:
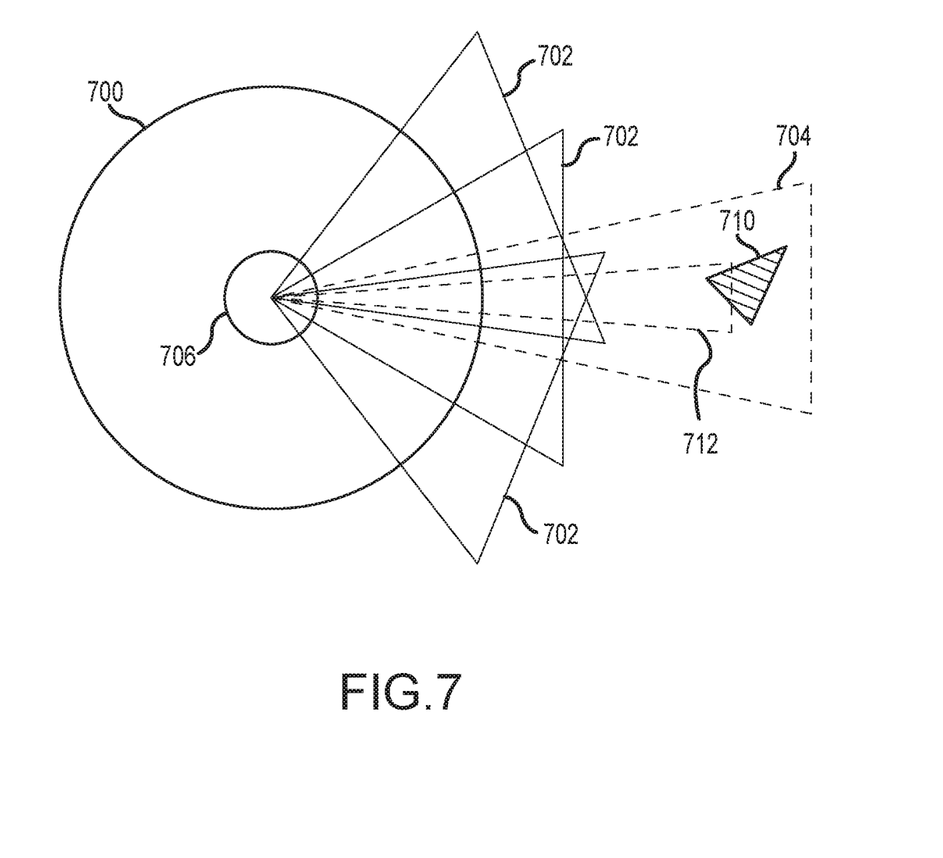
FIG. 7 is a diagram illustrating an embodiment for overlapping channel FOV.

Referring now to FIG. 7, in an embodiment of a sensor 700, N sensor channels are configured so that adjacent channel FOVs 702 overlap in an overlapped FOV 704. The sensor may include a mechanism 706 (such as a rotary motor) configured to rotate the sensor to point the overlapped FOV 704 at an object 710. The sensor requires no other parts other than possibly this mechanism. Each sensor channel 700 may command a spot-beam 712 to address the same region of the overlapped FOV 704 or to illuminate the same object 710 or same portion of the object 710 in the overlapped FOV 704.

In an embodiment, in track mode, the controller is configured to predict movement of the object from the current channel FOV to an adjacent channel FOV. The controller processes the angle and range to object measurements in the current channel FOV to estimate a position and velocity history of the object to predict a future track of the object including to predict movement of the object to the adjacent channel FOV. This information can be processed to handoff track from one channel to the next.

In an embodiment, in track mode, to hand-off an object from one channel to the next, the controller is configured to generate only one spot-beam to track the object in the overlapped FOV it the spot-beams are incoherent and to fade the current spot-beam and ramp next spot-beam if the beams are coherent to maintain uniform illumination of the object. A similar technique can be used in scan mode to hand-off the scanning spot-beam from one channel to the next.

In an embodiment, in track mode, the controller is configured to issue command signals to at least three adjacent sensor channels that overlap in the overlapped FOV to steer and time multiplex their respective spot-beams at the object in the overlapped FOV to make measurements of the object from three different angles. In this embodiment, the spot-beams are incoherent at the object and may cancel each other absent the time multiplexing. The capability to measure the angle and range to the object from a diversity of angles is important because the characteristics of the surface as a function of angle can be used to provide more information about the target such as for triangulation.

In an embodiment, in track mode, the controller is configured to measure phase differences between adjacent sensor channels and adjust the relative phase so that the spot-beams add coherently at the object in the overlapped FOV. The phase of the transmitted spot-beam can be known or measured via the optical pick-off. This is repeated to account for changes in range and beam parameters. Typically, one sensor channel is designated as the primary channel. The other channels may be secondary channels or their results averaged together with the primary channel. Typically, the object can assumed to exhibit Lambertian reflection in which power is reflected equally in all directions. As a result, the energy in the reflected component of the primary channel is N times greater than a single channel where N represents the umber of overlapping channels. The capability to use low power OPAs to transmit spot-beams and combine them to receive a higher power reflected component is important because it reduces the overall system SWaP-C and tracking/scanning capabilities.

Multiple situational awareness sensors may be stacked or configured to extend the vertical FOV or to overlap the horizontal or vertical FOV. In addition to simply increasing the vertical FOV, the overlapped FOV (horizontal or vertical) can enable hand-off, prediction of object movement across channels, increase angular diversity of measurement of the object or increase the received optical power in the reflected component.

Figure 8A:
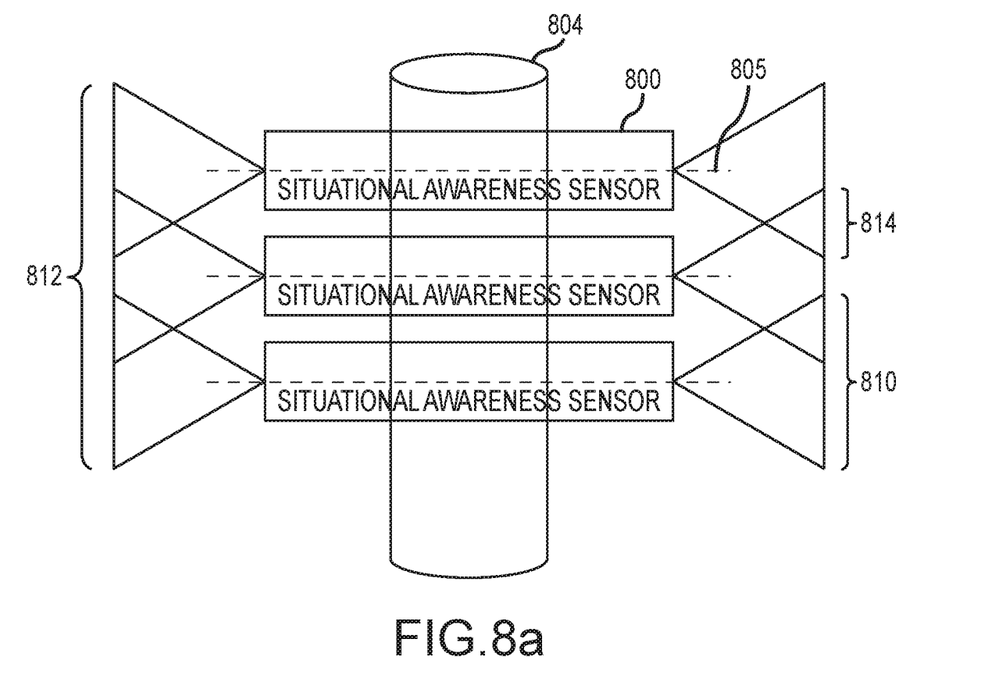
FIGS. 8a-b are side and top views of an embodiment in which multiple sensors are stacked to extend and overlap a vertical FOV.
Figure 8B:
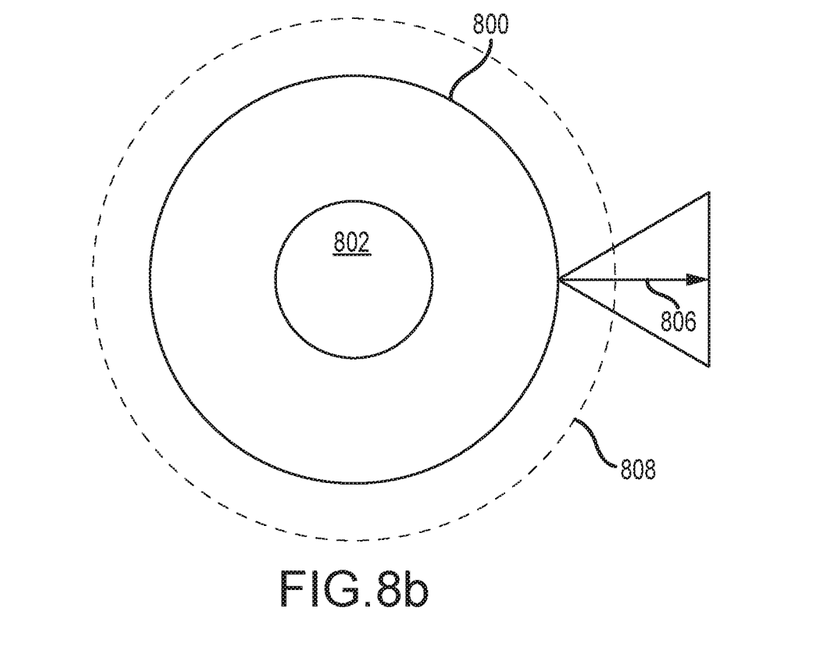

Referring now to FIGS. 8a and 8b, a plurality of situational awareness sensors 800 each having a central through hole 802 adapted for mounting on a vertical post or mast 804 are mounted one on top of the other in parallel planes 805 on vertical post or mast 804. In this embodiment, each sensor 800 is configured to command a spot-beam 806 to address a 360° degree horizontal FOV 808 in a defined vertical FOV 810. The stack of sensors both extends the vertical FOV to an extended vertical FOV 812 and overlaps the sensors' FOV to an overlapped FOV 814.

Figure 9A:
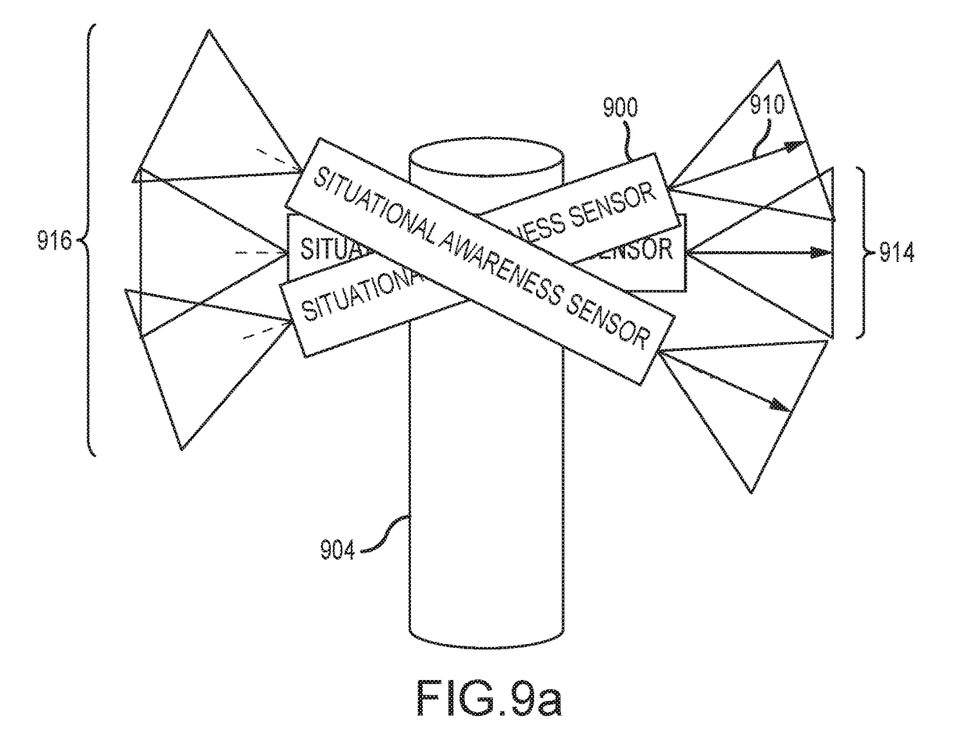
FIGS. 9a-b are side and top views of an embodiment in which multiple sensors are arranged to extend and overlap a vertical FOV.
Figure 9B:
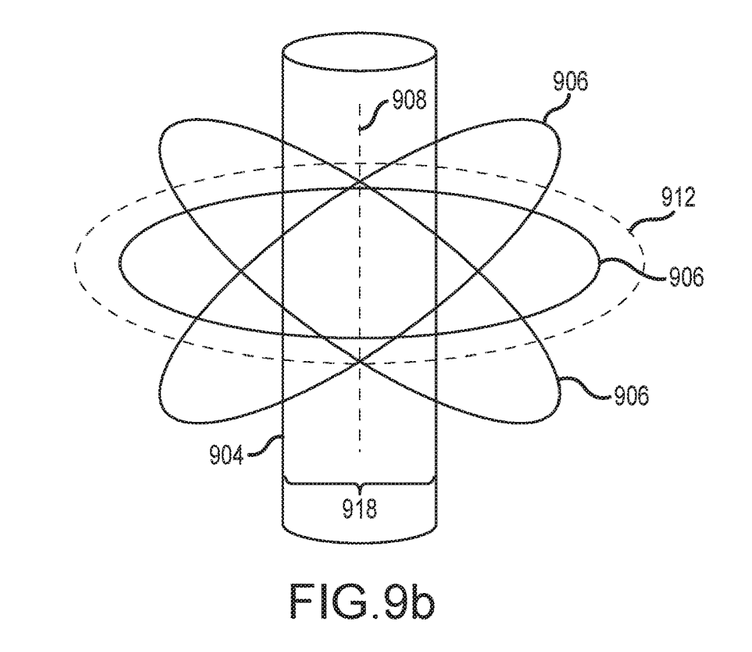

Referring now to FIGS. 9a and 9b, a plurality of situational awareness sensors 900 each having a central through hole adapted for mounting on a vertical post or mast 904 are mounted in tilted planes 906 that share a common vertex 908 on vertical post or mast 904. Each sensor includes N sensor channels located on a board that forms the tilted plane. In this embodiment, each sensor 900 is configured to command a spot-beam 910 to address a 360° degree horizontal FOV 912 (relative to the sensor plane 906) in a defined vertical FOV 914. For example, one of the sensors may lie in a horizontal plane, one of the sensors may be tilted at a positive angle with respect to the horizontal plane and one of the sensors may be tilted at a negative angle with respect to the horizontal plane. The stack of sensors both extends the vertical FOV to an extended vertical FOV 916 and overlaps the sensors' FOV to an overlapped FOV 918. This configuration provides greater overlap and less extension than the parallel stack of the previous embodiment.

Figure 10:
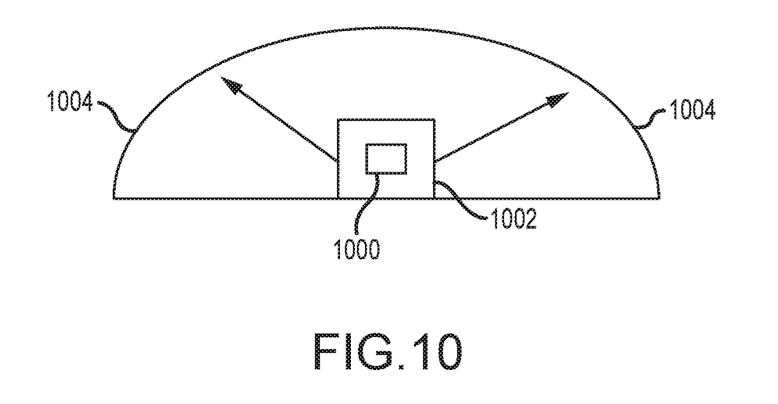
FIG. 10 is a diagram of an embodiment in which the sensor is used to center a vehicle relative to objects on opposing sides of the vehicle.

Referring now to FIG. 10, in an embodiment, a situational awareness sensor 1000 is mounted on a vehicle 1002 and configured to maintain centering of the vehicle relative to objects 1004 (e.g., opposing walls of a tunnel) on opposing sides of the vehicle. The controller is configured to process the angle and range to the objects and either issue commands to the vehicle to maintain centering or provide the angle range measurements to a separate system processor to provide such commands.

Figure 11:
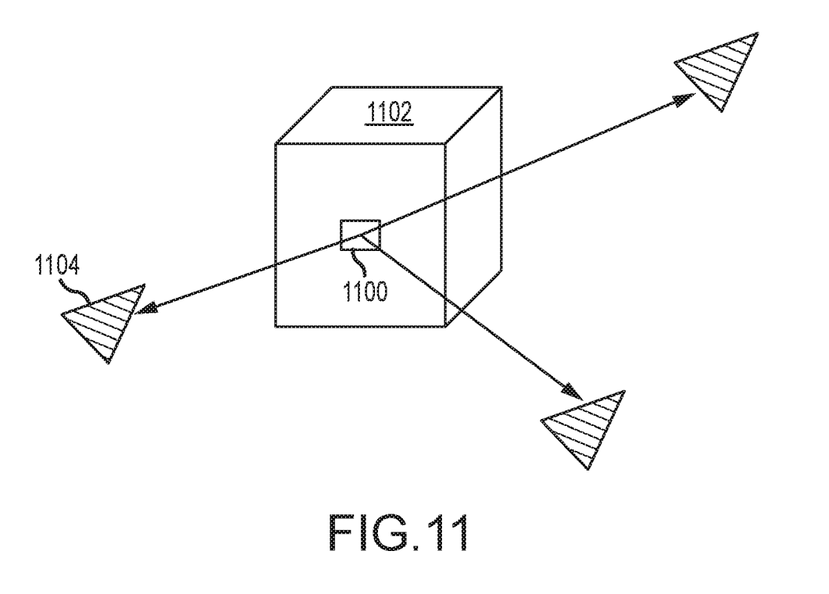
FIG. 11 is a diagram of an embodiment in which the sensor is used to determine platform rotation.

Referring now to FIG. 11, in an embodiment, a situational awareness sensor 1100 is mounted on a platform 1102 and configured to determine a rotation of the platform based on the change in angle of known objects 1104 across multiple channels. As previously described, an object track can be handed off from one channel to the next.

The situational awareness sensor built from a configuration of multiple OPAs is particularly well suited for a number of sensing applications.

In an embodiment, the sensor is mounted on a moving platform and configured provide information to the platform to avoid detected objects.

In an embodiment, multiple sensors are positioned at different locations and are in communication with one another. Each sensor is configured to avoid illuminating another sensor. Each sensor is configured to determine if an object is moving into the field of view or toward another sensor and to hand off track of the object to the other sensor. If an object was in the field of view of multiple sensors, all of the sensors could track the object to improve the estimate of the range and position. These functions could be done if some or all of the sensors were on moving platforms.

In an embodiment, the sensor is mounted on a rotating platform and the sensor channels are optimized for different ranges. A channel optimized for long rang detection (e.g. higher power) may detect an object. As the object approaches the sensor, the sensor is rotated so that a channel optimized for shorter ranges (e.g shorter laser pulses, higher angular scan rate) is used to measure the location as the range decreased.

In an embodiment, the sensor channels are configured to transmit and detect at different optical wavelengths so that the sensor could characterize the reflectivity of the object at different wavelengths. The sensor could be mounted on a rotating platform that could also be tilted.

In an embodiment, the sensor is configured to enable coast through and maintain track of an object of interest when the sensor encounters an obstruction. Here, the sensor could be tracking an object and detects another ($2^{nd}$) object at shorter range that is moving toward the same angle as the object of interest. The sensor could forecast when the $2^{nd}$ object is going to cross and maintain track of the object of interest. This could be applied when the sensor is fixed, when the sensor is moving, and when the object of interest is moving for one channel to another.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A situational awareness sensor, comprising:
a structure comprising a plurality of N optical apertures in a common plane; and
a fixed configuration of a plurality of N sensor channels positioned in said structure in the common plane in alignment with the N apertures, respectively, each said sensor channel comprising an optical phased array (OPA) that includes a plurality of solid-state laser emitters each configured to emit laser energy, a command circuit responsive to command signals to apply activation signals to the plurality of solid-state laser emitters to control the phase between the laser energies emitted from adjacent laser emitters to generate and control a divergence, shape and exit angle of a spot-beam through its aperture to scan the spot-beam across a channel field-of-view (FOV) in the common plane and a detector configured to sense a reflected component of the spot-beam from an object to provide angle and range measurements to the object, said channel FOVs covering in the aggregate a sensor FOV in the common plane greater than any single channel FOV; and
a controller configured to issue said command signals to each of said N sensor channel command circuits to command one or more of said spot-beams to address the sensor FOV in the common plane.

2. The sensor of claim 1, wherein said plurality of N optical apertures are spaced around the structure's circumference and the N sensor channels are spaced around and extend radially from a center of the structure in the common plane, said channel FOVs covering in the aggregate a 360° sensor FOV in the common plane.

3. The sensor of claim 1, wherein the controller is configured to process the angle and range to object measurements to estimate a surface shape of the object and to issue command signals to vary the shape of the spot-beam based on the estimated surface shape to maximize the reflected component of the spot-beam.

4. The sensor of claim 1, wherein the controller is configured to process the range measurements to the object to issue command signals to adjust a divergence of the spot-beam to place the spot-beam on the object such that the energy in the reflected component varies as approximately 1/range$^2$.

5. The sensor of claim 1, wherein the controller is configured to issue command signals based on beam divergence and the range to object measurements to maintain an approximately constant size of the spot-beam on the object with changes in the range to object.

6. The sensor of claim 1, wherein in scan mode the controller issues command signals to each of said N sensor channels to sequentially generate and steer respective spot-beams to produce a single contiguous spot-beam that scans the sensor FOV.

7. The sensor of claim 6, wherein in a track mode the controller issues command signals to each of said N sensor channels in which an object is detected to generate and steer respective spot-beams to track each said object, said controller configured to time multiplex the scan mode and the track mode.

8. The sensor of claim 1, wherein in scan mode the controller issues command signals to each of said N sensor channels to generate respective plane waves that cover each channel FOV in all channels simultaneously to cover the sensor FOV.

9. The sensor of claim 8, wherein in a track mode the controller issues command signals to each of said N sensor channels in which an object is detected to generate and steer respective spot-beams that each cover less than 5% of the channel FOV to track each said object.

10. The sensor of claim 1, wherein the N sensor channels are configured such that the FOVs of at least two adjacent sensor channels overlap in an overlapped FOV in the common plane.

11. The sensor of claim 10, wherein in a track mode the controller is configured to pass angle-to-object and range-to-object from one channel to the next as the object passes from one channel FOV to the next FOV, wherein the controller is configured to generate only one spot-beam to track the object in the overlapped FOV if the spot-beams are incoherent, wherein the controller is configured to fade the spot-beam for the one channel and ramp the spot-beam for the next channel if the spot-beams are coherent.

12. The sensor of claim 10, wherein in a track mode the controller is configured to issue command signals to at least three adjacent sensor channels that overlap in the overlapped FOV to steer and time multiplex their respective spot-beams at the object in the overlapped FOV.

13. The sensor of claim 10, wherein in a track mode the controller is configured to measure phase differences between said at least two adjacent sensor channels and to issue command signals to said at least two adjacent sensor channels to adjust the relative phase between the adjacent channels so that the respective spot-beams add coherently at the object in the overlapped FOV, one said sensor channel being a designated primary channel to sense the reflected component of the coherent spot-beams.

14. The sensor of claim 10, further comprising:
a mechanism configured to rotate the structure in the common plane to point the overlapped FOV at the object.

15. The sensor of claim 10, wherein the controller is configured to predict movement of the object from the current channel FOV to an adjacent channel FOV.

16. The sensor of claim 10, wherein each said channel FOV overlaps with at least one other channel FOV to form one said overlapped FOV of a plurality of overlapped FOVs.

17. The sensor of claim 1, further comprising a vehicle on which the sensor is mounted, said controller configured to issue command signals to at least two sensor channels on opposing sides of the vehicle to generate spot-beams to provide angle and range to an object, said controller configured to issue guidance signals to the vehicle to maintain centering of the vehicle relative to objects on opposing sides of the vehicle.

18. The sensor of claim 1, wherein the controller is configured to process the angle and range to object measurements from multiple channels to determine a rotation of the structure based on the change in angle of known objects across multiple channels.

19. The sensor of claim 1, wherein a plurality of said sensors are stacked perpendicular to the common plane to extend and overlap a vertical FOV.

20. The sensor of claim 1, wherein said plurality of N sensor channels are located in the common plane, further comprising a second plurality of said N sensor channels in a second plane tilted at a positive angle with respect to the common plane and a third plurality of said N sensor channels in a third plane tilted at a negative angle with respect to the common plane, said channel FOVs configured to extend and overlap a vertical FOV.

21. The sensor of claim 1, wherein at least two of said plurality of N sensor channels are configured to detect objects at different ranges to the object.

22. The sensor of claim 1, wherein at least two of said plurality of N sensor channels are configured to detect objects at different wavelengths.

23. A 360° situational awareness sensor, comprising:
a structure comprising a plurality of N optical apertures spaced around the structure's circumference in a common plane; and
a fixed configuration of a plurality of N sensor channels in the common plane spaced around and extending radially from a center of the structure in alignment with the N apertures, respectively, each said sensor channel comprising an optical phased array (OPA) that includes a plurality of solid-state laser emitters each configured to emit laser energy, a command circuit responsive to command signals to apply activation signals to the plurality of solid-state laser emitters to control the phase between the laser energies emitted from adjacent laser emitters to generate and control a divergence, shape and exit angle of a spot-beam through its aperture to scan the spot-beam across a channel field-of-view (FOV) in the common plane and a detector configured to sense a reflected component of the spot-beam from an object to provide angle and range measurements to the object, said channel FOVs covering in the aggregate a 360° sensor FOV in the common plane around the structure; and
a controller configured to time multiplex a scan mode to issue command signals to each of said N sensor channels to sequentially generate and steer respective spot-beams to produce a single contiguous spot-beam that scans the 360° sensor FOV in the common plane and a track mode to issue command signals to each of said N sensor channels in which an object is detected to independently generate and steer respective spot-beams in the common plane to track each said object.

24. A 360° situational awareness sensor, comprising:
a structure comprising a plurality of N optical apertures spaced around the structure's circumference in a common plane; and
a fixed configuration of a plurality of N sensor channels in the common plane spaced around and extending radially from a center of the structure in alignment with the N apertures, respectively, each said sensor channel comprising an optical phased array (OPA) that includes a plurality of solid-state laser emitters each configured to emit laser energy, a command circuit responsive to command signals to apply activation signals to the plurality of solid-state laser emitters to control the phase between laser energies emitted from adjacent laser emitters to generate and control a divergence, shape and exit angle of a spot-beam through its aperture to scan the spot-beam across a channel field-of-view (FOV) in the common plane and a detector configured to sense a reflected component of the spot-beam from an object to provide angle and range measurements to the object, said channel FOVs covering in the aggregate a 360° sensor FOV in the common plane around the structure, said channel FOVs of at least two adjacent sensor channels overlapping in an overlapped FOV in the common plane; and
a controller configured to issue command signals to each of said N sensor channels to steer one or more of said spot-beams in the common plane to address the 360° sensor FOV, wherein in a track mode the controller is configured to measure phase differences between said at least two adjacent sensor channels and to issue command signals to said at least two adjacent sensor channels to adjust the relative phase between the adjacent channels so that the respective spot-beams add coherently at the object in the overlapped FOV, one said sensor channel being a designated primary channel to sense the reflected component of the coherent spot-beams.

* * * * *